United States Patent
Wolfe et al.

(10) Patent No.: US 6,833,533 B1
(45) Date of Patent: Dec. 21, 2004

(54) AIR IMPINGEMENT CONVEYOR OVER

(75) Inventors: Gary L. Wolfe, Wichita, KS (US);
Ronald D. Wolfe, Wichita, KS (US);
Dwane D. Wolfe, Wichita, KS (US)

(73) Assignee: Wolfe Electric, Inc., Wichita, KS (US)

( * ) Notice: Subject to any disclaimer, the term of this patent is extended or adjusted under 35 U.S.C. 154(b) by 0 days.

(21) Appl. No.: 10/800,060

(22) Filed: Mar. 12, 2004

(51) Int. Cl.[7] .............................. F27B 9/10; F27B 9/36; A21B 1/26; A21B 1/48

(52) U.S. Cl. ...................... 219/400; 219/388; 126/214; 99/443 C; 99/474

(58) Field of Search ................................ 219/388, 400; 126/214; 99/474–476, 477, 386, 443 C; 34/76, 77, 463, 464

(56) References Cited

U.S. PATENT DOCUMENTS

| | | | | |
|---|---|---|---|---|
| 4,462,383 A | * | 7/1984 | Henke et al. .............. | 126/21 A |
| 4,474,498 A | * | 10/1984 | Smith .......................... | 432/144 |
| 5,421,316 A | * | 6/1995 | Heber ....................... | 126/21 A |
| 5,423,248 A | * | 6/1995 | Smith et al. ............... | 99/443 C |
| 5,717,192 A | * | 2/1998 | Dobie et al. ................. | 219/681 |
| 6,049,066 A | * | 4/2000 | Wilson ........................ | 219/400 |
| 6,707,010 B2 | * | 3/2004 | Kuenen ....................... | 219/388 |

* cited by examiner

Primary Examiner—Joseph Pelham
(74) Attorney, Agent, or Firm—Kenneth H. Jack; Davis & Jack, LLC

(57) ABSTRACT

A pizza oven having a baking chamber, having a loading port, and having a dispensing port; a conveyor extending longitudinally through the baking chamber from the loading port to the dispensing port; an air plenum having an air intake port and a plurality of air output ports; an air blower connected to the air plenum for moving heated air from the air intake port to the air output ports; and having upper and lower pluralities of ducts respectively overlying and underlying the conveyor, each duct having a proximal end attached to the plenum and a distal end, each duct further having proximal and distal air discharge ports respectively positioned proximally and distally from a vertical plane extending longitudinally along and substantially centrally through the conveyor, each duct's proximal air discharge port being larger than the duct's distal air discharge port.

14 Claims, 4 Drawing Sheets

AIR IMPINGEMENT CONVEYOR OVER

FIELD OF THE INVENTION

This invention relates to ovens for food baking. More particularly, this invention relates to such ovens which incorporate food product supporting conveyors for transport of food to be baked through the ovens, and which further incorporate air driving blower and duct assemblies for accelerated cooking through impingement of streams of heated air against the conveyed food products.

BACKGROUND OF THE INVENTION

Air impingement conveyor ovens are commonly utilized in the food processing and restaurant industry for swift baking of pizzas. Such ovens may be utilized for swift baking of numerous other types of food items. Accordingly, references below to pizzas are intended to generically refer to all types of baked foods which are amenable to cooking or baking upon a foraminous conveyor and which are amenable to accelerated cooking through hot air impingement during conveyance.

Within the cooking chamber of an air impingement conveyor pizza oven, it is desirable to achieve even or consistent rates of cooking across the lateral width of the conveyor. A known means of attempting to achieve a consistent lateral cooking rate includes introduction of an air duct assembly into the oven and configuring such assembly to evenly laterally disperse hot air jets or air discharge ports along the laterally extending lengths of the oven's air ducts. Graphic depictions of such industry practice appear in U.S. Pat. No, 6,250,296 issued Jun. 26, 2001 to Norris, et al. (See Drawing FIGS. 1–6, 8, 9, 11, 15, 19A-21, and 23); U.S. Pat. No. 6,227,189 issued May 8, 2001 to Dougherty (See Drawing FIGS. 1–5, 8, 9, 11, 15, 19A-21, 23 and 35); U.S. Pat. No. 6,481,433 issued Nov. 19, 2002 to Schjerven, Sr., et al. (See Drawing FIG. 1C); U.S. Pat. No. 6,526,961 issued Mar. 4, 2003 to Hardenburger (See Drawing FIGS. 4, 6, and 11); U.S. Pat. No. 5,584,237 issued Dec. 17, 1996 to Moshonas (See Drawing FIGS. 3, 5, and 8); U.S. Pat. No. 6,192,877 issued Feb. 27, 2001 to Moshonas, et al. (See Drawing FIG. 4); U.S. Pat. No. 6,655,373 issued Dec. 2, 2003 to Wicker (See Drawing FIGS. 9 and 10); U.S. Pat. No. 5,671,660 issued Sep. 30, 1997 to Moshonas (See Drawing FIGS. 3 and 8); U.S. Pat. No. 4,753,215 issued Jun. 28, 1998 to Kaminski, et al. (See Drawing FIG. 1); U.S. Pat. No. 5,454,295 issued Oct. 3, 1995 to Cox, et al. (See Drawing FIGS. 3, 3a, 9, and 10); U.S. Pat. No. 4,679,542 issued Jul. 14, 1987 to Smith, et al. (See Drawing FIGS. 2, 4–6, 8, 10, and 11); U.S. Pat. No. 5,423,248 issued Jun. 13, 1995 to Smith, et al. (See Drawing FIGS. 3, 7, 9, and 10); U.S. Pat. No. 5,131,841 issued Jul. 21, 1992 to Smith, et al. (See Drawing FIGS. 3, 7, 9, and 10); U.S. Pat. No. 4,960,100 issued Oct. 2, 1990 to Pellicane (See Drawing FIGS. 2, 5, and 6); U.S. Pat. No. 5,025,775 issued Jun. 25, 1991 to Crisp (See Drawing FIGS. 7 and 8); U.S. Pat. No. 4,457,291 issued Jul. 3, 1984 to Henke (See Drawing FIG. 1); U.S. Pat. No. 4,471,750 issued Sep. 18, 1984 to Burtea (See Drawing FIG. 2); U.S. Pat. No. 6,592,364 issued Jul. 15, 2003 to Zapata, et al. (See Drawing FIG. 2); U.S. Pat. No. 4,626,661 issued Dec. 2, 1986 to Henke (See Drawing FIGS. 2 and 15); U.S. Pat. No. 4,576,090 issued Mar. 18, 1986 to Burtea (See Drawing FIG. 2); U.S. Pat. No. 4,556,043 issued Dec. 13, 1985 to Bratton (See Drawing FIGS. 2 and 11); U.S. Pat. No. 4,462,383 issued Jul. 31, 1984 to Henke, et al. (See Drawing FIGS. 2 and 3); U.S. Pat. No. 5,683,240 issued Nov. 4, 1987 to Smith, et al. (See Drawing FIGS. 3, 7, 9, and 10); U.S. Pat. No. 5,231,920 issued Aug. 3, 1993 to Alden, et al. (See Drawing FIGS. 4–6); U.S. Patent Application No. 2003/0217645 published Nov. 27, 2003, Jones, et al. Inventor (See Drawing FIGS. 3 and 4); U.S. Pat. No. 5,180,898 issued Jan. 19, 1993 to Alden, et al. (See Drawing FIGS. 4, 5, and 7A); and in U.S. Pat. No. 4,591,333 issued May 27, 1986 to Henke (See Drawing FIGS. 2, 3, and 5).

The practice of evenly laterally dispersing a pizza oven's air discharge ports across the lateral width of the oven's conveyor undesirably causes uneven cooking rates. Air duct chambers or plenums immediately overlying and underlying the air discharge ports depicted in the above referenced patents include closed distal ends. As heated air moves laterally and distally through such ducts, a substantial portion of the air is stopped by and rebounds laterally toward the duct's proximal end. Such air flow stoppage and rebound effect creates zones of relatively compressed air at the distal ends of the ducts. Accordingly, the duct chambers overlying and underlying the air discharge ports depicted in the above cited patents tend to create an air pressure gradients wherein the air pressures are lowest at the proximal ends of the ducts, and wherein the air pressures are relatively higher at the distal ends of the ducts. The depicted industry practice of evenly laterally dispersing such ducts' air discharge ports undesirably allows air to emit from the ducts at rates which conform with such laterally or distally increasing air pressure gradient.

The apparent intent of the industry practice of evenly laterally distributing air discharge ports across the lateral width of an air impingement conveyor oven is to achieve even lateral cooking rates. However, such industry practice undesirably produces uneven rates of air flow across the lateral width of the oven and, contrary to such apparent intent, undesirably causes uneven cooking rates across such lateral width.

The instant inventive air impingement conveyor oven solves or ameliorates the problems discussed above by progressively lessening the size and/or segmentation of air discharge ports positioned along the laterally extending lengths of the ducts, the progressive lessening resulting in even air flow and even cooking rates across the lateral width of the oven.

BRIEF SUMMARY OF THE INVENTION

A first structural component of the instant inventive air impingement food conveying oven comprises a cooking chamber including or incorporating air heating means such as a natural gas burning heater or an electrical resistance element heater. The cooking chamber preferably comprises a longitudinally oblongated box. Longitudinally opposed walls of the cooking chamber preferably situate a horizontally oblongated food loading port at one end of the chamber and situate a similarly configured food dispensing port at the opposite end of the chamber.

A front wall of the cooking chamber preferably comprises a removable panel allowing easy access to internal structures for maintenance and cleaning, and preferably, the panel includes a hinged supplemental access door. Preferably, all walls of the cooking chamber are thermally insulated. Suitably, though less desirably, the cooking chamber may be configured as depicted in Kingdon, et al., supra, wherein the loading and dispensing ports comprise open ends, and wherein the cooking chamber assumes the configuration of a forwardly and longitudinally opening "C" channel.

A further structural component of the instant inventive oven comprises a food supporting conveyor which is mounted upon the cooking chamber, the conveyor extending longitudinally through the cooking chamber for carrying food products from the loading port to the dispensing port. Preferably, the conveyor comprises a foraminous continuous loop belt, the belt's foramens allowing heated air to flow from locales below the conveyor to impinge upon lower surfaces of food products resting upon the conveyor. A preferred configuration of the preferred foraminous continuous loop belt comprises a flexible chain linkage of parallel laterally extending bars, the bars serving as a moving cooking grate. Alternately, the conveyor may comprise foraminous food supporting trays or trolleys which are guided through the cooking chamber along longitudinally extending tracks. Other known means for longitudinally moving or conveying food products while cooking are considered to be includable within ovens falling within the scope of the instant invention.

A further structural component of the instant invention comprises an air manifold or plenum having an air intake port and having a plurality of air output ports. The air plenum preferably comprises a box chamber having series of upper and lower air output ports extending through the chamber's front wall and having a fan shrouding air intake aperture within the chamber's back wall. Numerous other duct or manifold assemblies for dividing a discreet stream of input air into a plurality of streams of output air are considered to constitute plenums which are includable within ovens falling within the scope of the invention.

Air moving means associated with the air plenum are necessarily provided, such means preferably comprising an electric motor driven rotary fan whose blades are rotatably positioned within the plenum's shrouded intake port as described above. Suitably, multiple rotary fans may be utilized. Alternately, the air moving means may suitably comprise a sirocco or "squirrel cage" fan whose output is connected to the plenum's air intake port by an air conduit.

A further structural component of the instant inventive oven comprises upper and lower pluralities of laterally extending ducts, preferably finger ducts, which respectively overlie and underlie the conveyor. Each of the upper and lower ducts preferably has a proximal air intake end which is attached to one of the plenum's air output ports. Preferably, each duct among the upper and lower pluralities of ducts has a proximal air discharge port and has a distal air discharge port. The proximal and distal air discharge ports of the upper ducts necessarily open downwardly for directing streams of heated air downwardly over food products conveyed by the conveyor, and the proximal and distal air discharge ports of the lower ducts correspondingly open upwardly for upward direction of air streams over lower surfaces of such food products.

Preferably, each of the proximal air discharge ports are positioned proximally from a bisecting vertical reference plane which extends longitudinally along and substantially centrally through the conveyor. Correspondingly, each distal air discharge port is preferably positioned distally from such reference plane.

In operation of the instant invention, as heated air flows laterally and distally from the proximal air inlet ends of the upper and lower pluralities of ducts, the air tends to compress at the distal ends of such ducts, the air being comparatively rarified at the duct's proximal ends. By restricting the size and/or segmentation of the air discharge ports at the distal compressed air ends of the ducts, and by increasing the size and/or segmentation of the air discharge ports at the proximal rarified air ends of the ducts, quantities of heated air emitting from the proximal and distal air discharge ports are desirably equalized.

For enhanced distribution of heated air which emits from the air discharge ports of the ducts, each of such ports preferably comprises a plurality of apertures extending through an air discharge plate, the air discharge plates forming walls of the ducts.

Each of the ducts of the instant inventive oven may suitably alternately comprise an alternate proximal air discharge port, a medial air discharge port, and an alternate distal air discharge port, such triple of ports being respectively positioned proximally from, between, and distally from a pair of trisecting vertical reference planes which extend longitudinally along and substantially trisectingly through the conveyor, each duct's alternate proximal air discharge port being larger than the duct's medial air discharge port, and the medial air discharge port in turn being larger than the duct's alternate distal air discharge port. Similarly with the paired proximal and distal air discharge ports described above, the alternate proximal, medial, and alternate distal triple of air discharge ports preferably comprise pluralities of apertures extending through air discharge plates.

While a preferred embodiment of the instant inventive oven incorporates upper and lower ranks of ducts for facilitating hot air impingement upon both upper and lower surfaces of food products which are conveyed through the oven chamber, ovens which include only an upper rank of such ducts or only a lower rank of such ducts are considered to fall within the scope of the instant invention.

Accordingly, an object of the instant inventive air impingement conveyor oven is the equalization of food impinging air flows across the lateral width of the oven's conveyor by positioning larger or more numerous air discharge ports proximally toward air input ends of air carrying ducts, and by positioning smaller or less numerous air discharge ports distally toward the opposite ends of such ducts.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 3:
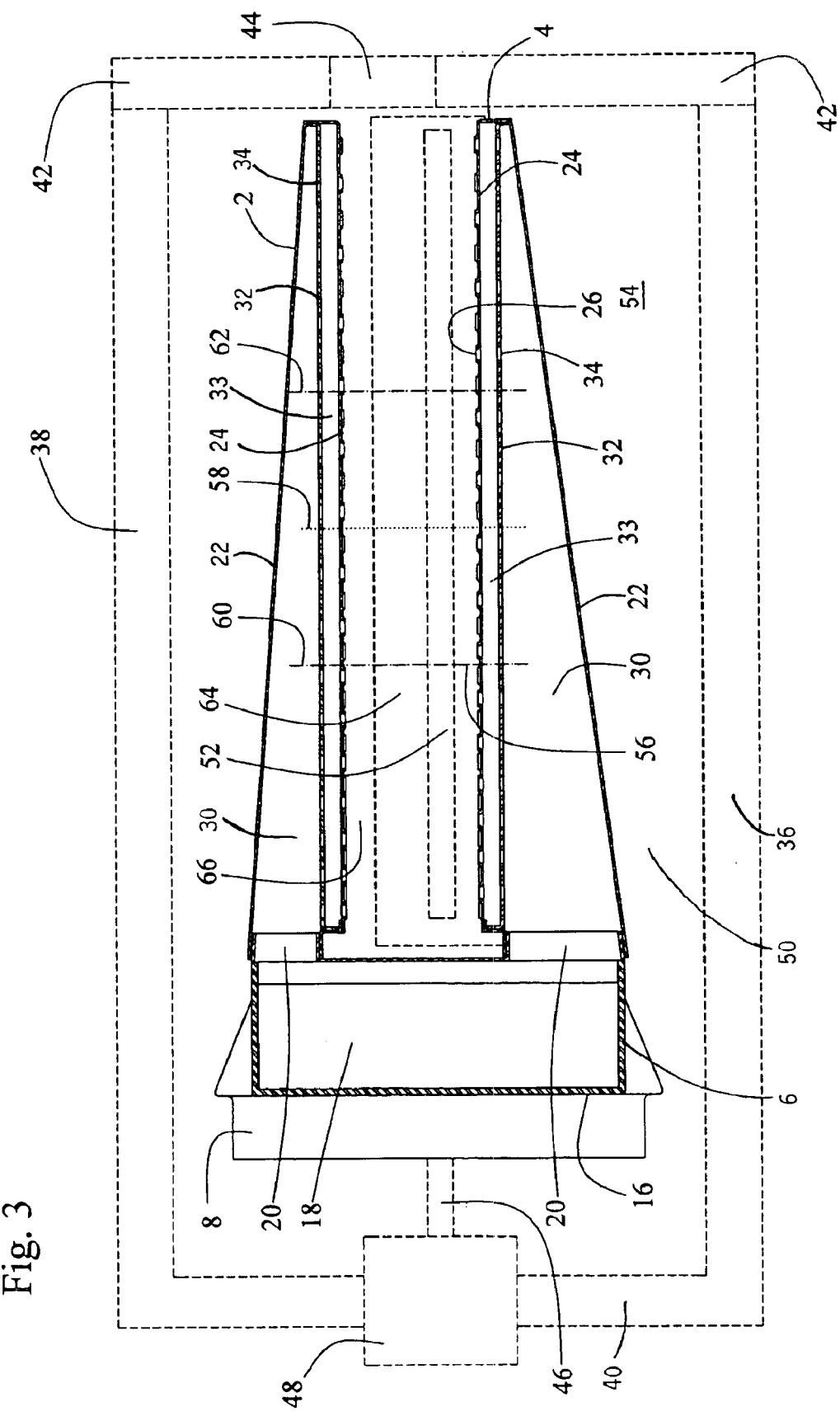
FIG. 3 is an alternate sectional view as indicated in FIG. 1, the view of FIG. 3 further representationally depicting a cooking chamber, a fan motor, a conveyor, and loading/dispensing ports of the instant invention.

Referring now to the drawings, and in particular to FIG. 3, the instant inventive oven preferably comprises an insulated floor 36, an insulated ceiling 38, an insulated rear wall 40, and an insulated longitudinal end wall 50. The front wall of the instant inventive oven preferably comprises a removable front panel 42, such panel having a hinged access door 44. A second longitudinal end wall (not within the view of FIG. 3) positioned opposite longitudinal end wall 50 completes a cooking chamber having an interior cooking space 54. End wall 50 preferably has a rectangular cooked food dispensing port 64, and said opposite end wall preferably includes a similarly configured raw food product loading port. A longitudinally extending and preferably foraminous continuous loop conveyor 52 preferably extends through a "C" channel space 66 from said food loading port to dispensing port 64.

Referring further to FIG. 3, a vertically oriented reference plane 58 represented by dotted line extends longitudinally along conveyor 52 and extends substantially centrally through said conveyor, the plane 58 referentially bisecting the conveyor 52 into a rearward or proximal side and a forward or distal side. Alternately reference planes 60 and 62 represented by alternating dotted and dashed lines substantially trisect conveyor 52 for purposes of reference into an alternate proximal section, a medial section, and an alternate distal section.

Figure 1:
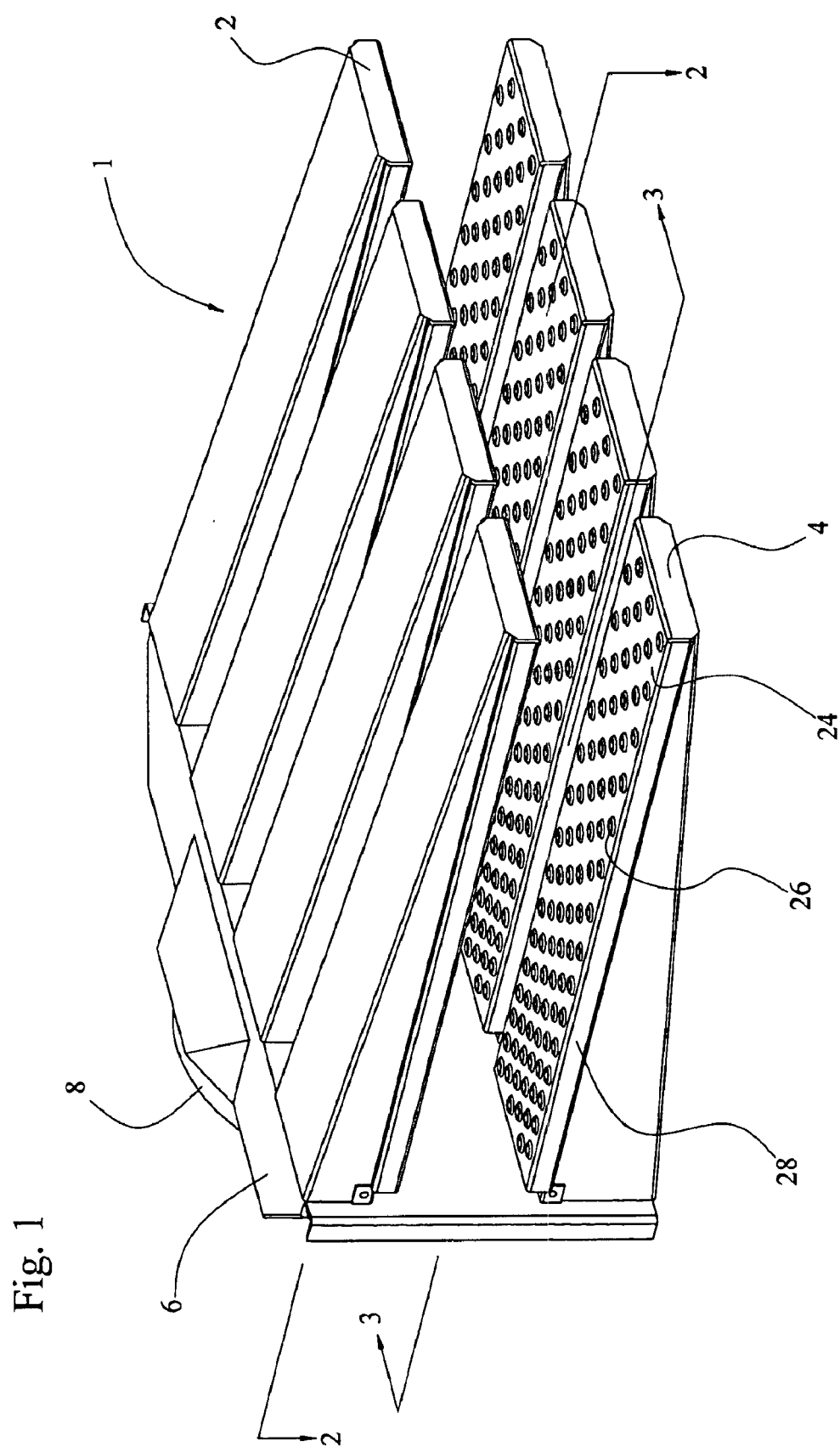
FIG. 1 is an isometric view of the plenum and finger duct assembly of the instant invention.
Figure 2:
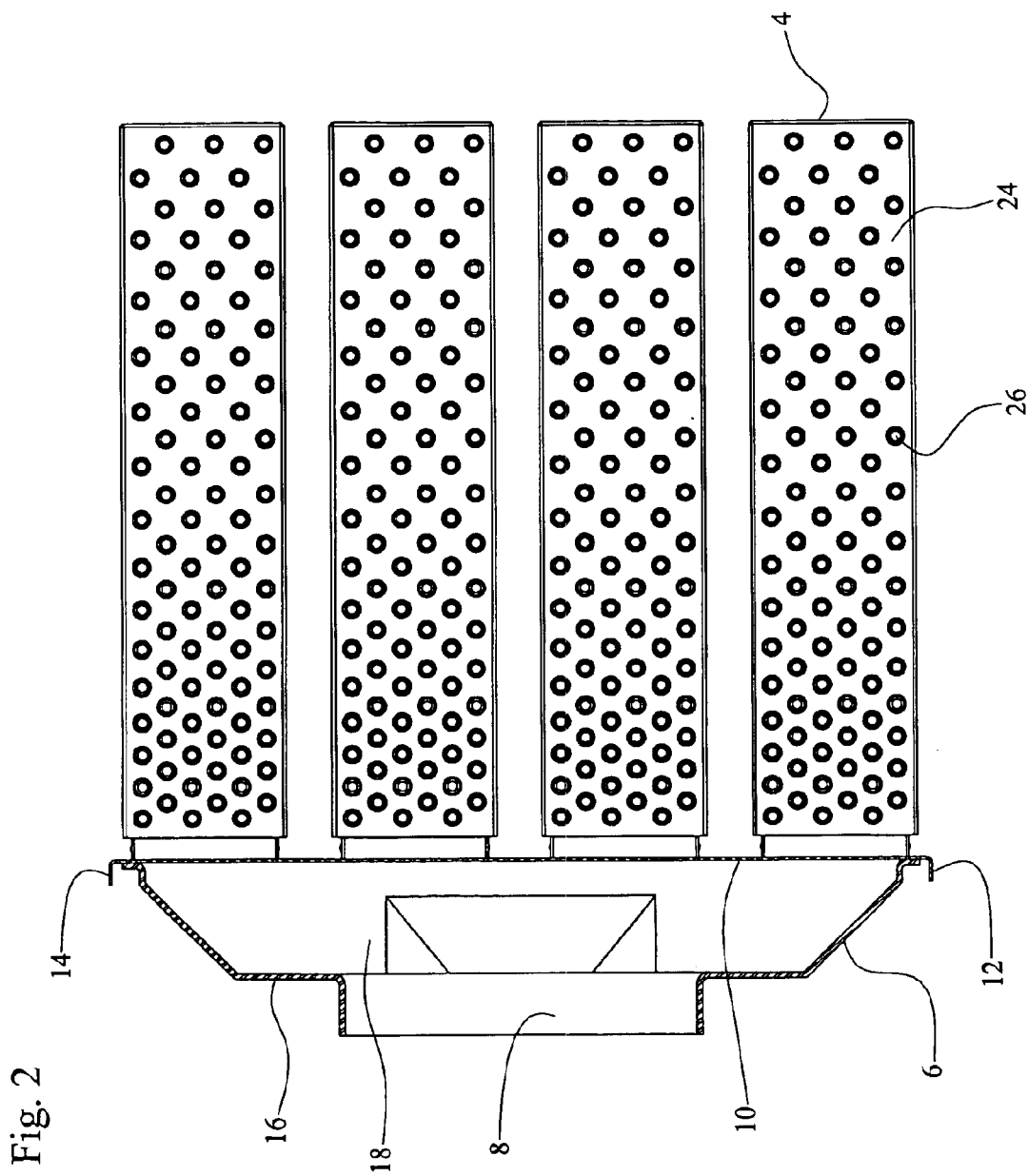
FIG. 2 is a sectional view as indicated in FIG. 1.

Referring simultaneously to FIGS. 1–3, an air plenum 6 is suspended within the interior oven space 54 via mounting brackets 12 and 14, the air plenum 6 having a front wall 10, a back wall 16, an interior space 18, an annularly flanged air intake port 8, and a plurality of air outlet ports 20. An electric motor 48 drives an impeller or fan (not depicted within views) via drive shaft 46, such fan being shrouded within the annular flange of air intake port 8. Such shrouded fan draws heated air from space 54 into the interior space 18 of plenum 6 and, in sequence, expels such air forwardly or distally through outlet ports 20. In a following sequence, the heated air enters the inner chambers 30 of the upper finger ducts 2 and lower finger ducts 4. Referring simultaneously to all figures, the lower finger ducts 4 are configured similarly with the upper finger ducts 2.

Referring simultaneously to FIGS. 1–3, each of the finger ducts comprises a distally extending and upwardly or downwardly sloping wall 22 and an air discharge plate 24 which is slidably and removably mounted via slide flanges 28. The air discharge plates 24 in combination with the sloped walls 22 define interior duct spaces 30.

Figure 4:
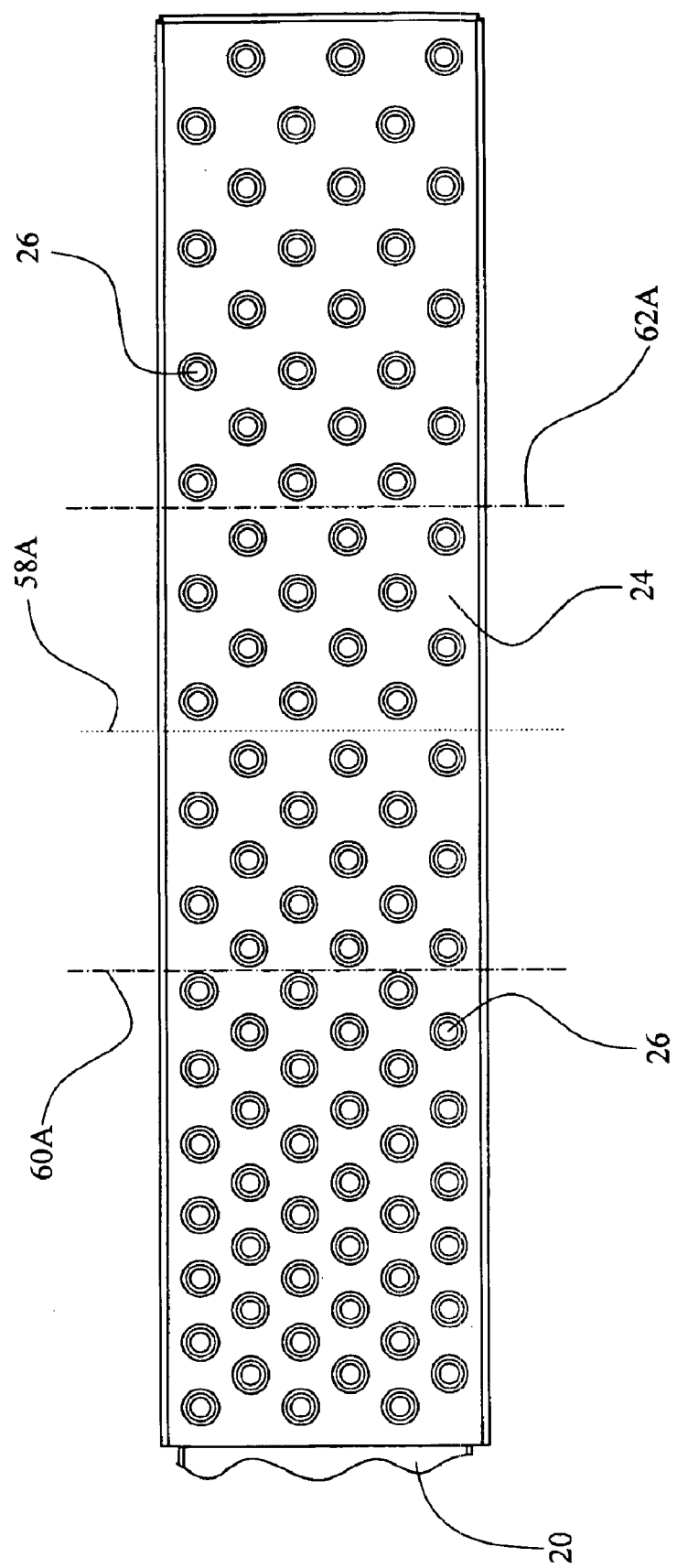
FIG. 4 is a magnified detail of a portion of FIG. 2.

Referring simultaneously to FIGS. 3 and 4, the conveyor bisecting vertical reference plane 58 substantially or approximately further bisects the finger ducts longitudinally along dotted reference line 58A, such line, for purposes of reference, dividing the finger ducts into proximal and distal sections. The alternate conveyor trisecting vertical reference planes 60 and 62 in a similar fashion longitudinally trisect the finger ducts along alternating dotted and dashed reference lines 60A and 62A.

Referring to FIG. 4, air columnating apertures 26 within air discharge plate 24 each have a chamfered wall for enhanced air jet formation, each of such apertures 26 preferably being consistently sized. Apertures 26 which are positioned proximally from bisecting line 58A cumulatively comprise a proximal air discharge port while those apertures 26 which are positioned distally from line 58A cumulatively comprise a distal air discharge port. Preferably, the proximal air discharge ports are each 50% larger than their corresponding distal air discharge ports, such size differential resulting from positioning of 60% of the apertures 26 proximally from line 58A and correspondingly positioning 40% of such apertures distally from line 58A. Suitably, such distribution percentages may vary within a range of plus or minus 5%, variations greater than 5% being less desirable.

Referring simultaneously to FIGS. 3 and 4, the trisecting reference planes 60 and 62 and their corresponding duct trisecting lines 60A and 62A delineate alternate proximal, medial, and alternate distal air discharge ports, the alternate proximal air discharge ports being positioned proximally from line 60A, the alternate distal air discharge ports being positioned distally from line 62A, and the medial air discharge ports being positioned between lines 60A and 62A. As depicted in FIG. 4, the alternate proximal air discharge ports preferably comprise thirty-nine consistently sized apertures 26, and the size of such alternate proximal air discharge ports is preferably approximately 44.4% greater than that of the medial air discharge port. In turn, the medial air discharge port preferably has a size which is greater than that of the alternate distal air discharge port. The size differential between the alternate proximal and medial air discharge ports may suitably vary by plus or minus 5%, variations greater than 5% being less desirable.

Referring to FIG. 3, as heated air enters the interior space 30 of finger duct 4 through port 20, the air flows laterally and distally, and the air compresses as it approaches the distal end of space 30. While the heated air flows distally, the air simultaneously flows upwardly through apertures 34 within air columnating plate 32. Preferably, apertures 34 vertically align with apertures 26. Thereafter, the heated and columnated air traverses space 33 to emit from the chamfered walls air columnating ports 26. Referring further simultaneously to FIG. 4, it can be seen that the distal or alternate distal air discharge ports overlie high air pressure zones within the finger ducts, while the proximal or alternate proximal air discharge ports overlie lower air pressures zones within the finger ducts. Accordingly, an inverse relationship of air pressure and port size is established along the lengths of the finger ducts. Such inverse relationship desirably equalizes the flow of heated air along the lengths of the finger ducts, desirably resulting in consistent rates of cooking at varying lateral positions within the oven.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. A pizza oven comprising:
   (a) a cooking chamber having a loading port and a dispensing port;
   (b) a conveyor extending longitudinally through the cooking chamber from the loading port to the dispensing port;
   (c) an air plenum having an air intake port and having a plurality of air output ports;
   (d) air moving means connected operatively to the air plenum for moving heated air from the air intake port to the air output ports; and,
   (e) upper or lower pluralities of ducts overlying or underlying the conveyor, each duct having a proximal end attached to the plenum and a distal end, each duct further having proximal and distal air discharge ports respectively positioned proximally and distally from a vertical plane extending longitudinally along and substantially centrally through the conveyor, each duct's proximal air discharge port being larger than said each duct's distal air discharge port.

2. The pizza oven of claim 1 wherein the ducts among the upper or lower pluralities of ducts further comprise air discharge plates, and wherein the proximal and distal air discharge ports comprise pluralities of apertures extending through the air discharge plates.

3. The pizza oven of claim 2 wherein each aperture among the pluralities of apertures is substantially circular.

4. The pizza oven of claim 3 wherein each aperture among the pluralities of apertures has a chamfered air columnating wall.

5. The pizza oven of claim 4 wherein the apertures among the pluralities of apertures are substantially consistently sized.

6. The pizza oven of claim 2 wherein each duct among the upper or lower pluralities of ducts further comprises an apertured air columnating plate overlying or underlying said each duct's air discharge plate, the apertures of each air columnating plate aligning with the apertures of the air discharge plate underlying or overlying said each air columnating plate.

7. The pizza oven of claim 6 wherein each duct among the upper or lower pluralities of ducts further comprises a distally extending and sloping wall.

8. A pizza oven comprising:
(a) a cooking chamber having a loading port and a dispensing port;
(b) a conveyor extending longitudinally through the cooking chamber from the loading port to the dispensing port;
(c) an air plenum having an air intake port and having a plurality of air output ports;
(d) air moving means connected operatively to the air plenum for moving heated air from the air intake port to the air output ports; and,
(e) upper or lower pluralities of ducts overlying or underlying the conveyor, each duct having a proximal end attached to the plenum and a distal end, each duct further having proximal, medial, and distal air discharge ports respectively positioned proximally from, between, and distally from a pair of vertical planes extending longitudinally along and substantially trisectingly through the conveyor, each duct's proximal air discharge port being larger than said each duct's medial air discharge port, and each duct's medial air discharge port being larger than said each duct's distal air discharge port.

9. The pizza oven of claim 8 wherein each duct among the upper or lower pluralities of ducts comprises an air discharge plate, and wherein the proximal, medial, and distal air discharge ports comprise pluralities of apertures extending through the air discharge plates.

10. The pizza oven of claim 9 wherein each aperture among the pluralities of apertures is substantially circular.

11. The pizza oven of claim 10 wherein each aperture among the pluralities of apertures has a chamfered air columnating wall.

12. The pizza oven of claim 11 wherein the apertures among the pluralities of apertures are substantially consistently sized.

13. The pizza oven of claim 9 wherein each duct among the upper or lower pluralities of ducts further comprises an apertured air columnating plate overlying or underlying said each duct's air discharge plate, the apertures of each air columnating plate aligning with the apertures of the air discharge plate underlying or overlying said each air columnating plate.

14. The pizza oven of claim 13 wherein each duct among the upper or lower pluralities of ducts further comprises a distally extending and sloping wall.

* * * * *

UNITED STATES PATENT AND TRADEMARK OFFICE
CERTIFICATE OF CORRECTION

| | | |
|---|---|---|
| PATENT NO. | : 6,833,533 B1 | |
| APPLICATION NO. | : 10/800060 | |
| DATED | : December 21, 2004 | |
| INVENTOR(S) | : Wolfe et al. | |

It is certified that error appears in the above-identified patent and that said Letters Patent is hereby corrected as shown below:

On the Title Page Item [21]
Please delete Application Serial No. 10/800,006 and insert the correct Application Serial No. 10/800,060.

Signed and Sealed this

Twenty-second Day of May, 2007

JON W. DUDAS
*Director of the United States Patent and Trademark Office*